United States Patent [19]

Thuy

[11] 4,345,327

[45] Aug. 17, 1982

[54] SELF-MONITORED PROCESS CONTROL DEVICE

[75] Inventor: Pham D. Thuy, Chatenay Malabry, France

[73] Assignee: Societe Francaise d'Equipements pour la Navigation Aerienne, Velizy-Villacoublay, France

[21] Appl. No.: 193,268

[22] PCT Filed: Jun. 29, 1979

[86] PCT No.: PCT/FR79/00056

§ 371 Date: Mar. 7, 1980

§ 102(e) Date: Feb. 20, 1980

[87] PCT Pub. No.: WO80/00198

PCT Pub. Date: Feb. 7, 1980

[30] Foreign Application Priority Data

Jul. 7, 1978 [FR] France .................. 78 20286

[51] Int. Cl.[3] ............................ G06F 11/18
[52] U.S. Cl. .......................... 371/9; 318/564; 244/194; 371/36; 371/68
[58] Field of Search ............... 371/9, 36, 68; 364/440; 244/194; 318/564

[56] References Cited

U.S. PATENT DOCUMENTS

| | | |
|---|---|---|
| 3,551,776 | 12/1970 | Tawfik .................. 318/564 |
| 3,665,173 | 5/1972 | Bouriclus .................. 371/8 |
| 3,688,099 | 8/1972 | Buscher .................. 371/68 |
| 3,805,235 | 4/1974 | Foster et al. .................. 371/36 |
| 3,881,670 | 5/1975 | Doniger .................. 371/36 |
| 3,882,406 | 5/1975 | Graves et al. .................. 371/68 |
| 4,032,757 | 6/1977 | Eccles .................. 318/564 |
| 4,035,705 | 7/1977 | Miller .................. 318/564 |
| 4,092,578 | 5/1978 | Fabian .................. 318/564 |
| 4,130,241 | 12/1978 | Merdith et al. .................. 371/36 |
| 4,199,799 | 4/1980 | Ostenso et al. .................. 318/564 |

FOREIGN PATENT DOCUMENTS 2334993 7/1977 France .

*Primary Examiner*—Charles E. Atkinson
*Attorney, Agent, or Firm*—Browdy and Neimark

[57] ABSTRACT

Self monitored process control device comprising two complementary circuits (4,5) allowing control signals to be replaced when erroneous, by safety limit values computed by separate circuits (10,11,17,18), a circuit (21) sending a warning signal when signals at the output of the two complementary circuits (4,5) are not identical, a safety circuit (23) permitting selection of the healthy signal from the two complementary circuits (4,5) upon failure of one of the complementary circuits (4,5) and a monitoring circuit (26,28,29) allowing a failure of the safety circuit (23) to be indicated. The invention applies especially to aircraft flight control.

3 Claims, 1 Drawing Figure

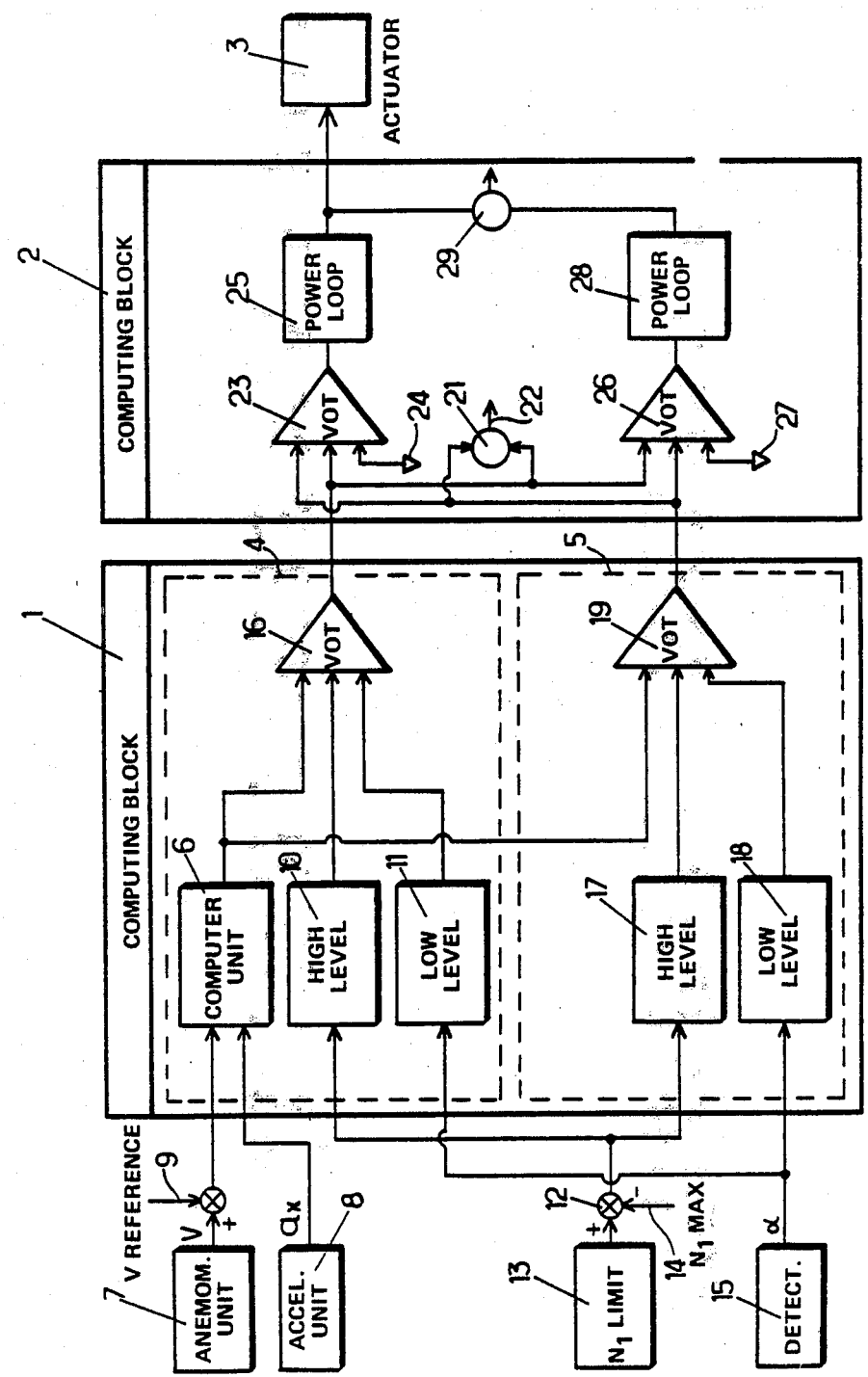

SELF-MONITORED PROCESS CONTROL DEVICE

The present invention is related to a self-monitored process control device comprising at least one actuator device driven by a control signal. The control signal is computed according to a flight control law, using a generating device to implement the law.

The invention is more particularly related to a control system with integrated monitoring and safety systems allowing an erroneous control signal, which could result from a malfunction of the processing device and/or a failure occurring in one of its own curcuits, to be detected and neutralized simultaneously.

The present invention can be applied favorably, but not exclusively, to the control circuits of an aircraft automatic flight control system, to prevent the aircraft from being put into any hazardous configuration upon a failure.

To achieve this result, it is known to double each of the functions of the system for implementing the automatic flight control law.

This widely used means is safe but it has the drawback of being costly.

The invention aims at achieving this result by an economical, reliable, and safe means without having to duplicate the flight control functions.

On the other hand, there is known a safety system using a vote which selects a signal $\delta_2$ out of three signals $\delta$; $\delta_1$ and $\delta_2$; the value of the selected signal $\delta_2$ representing the average value of the other two signals. See French Pat. No. 75-37862 of Dec. 10, 1975.

But this known system does not make it possible, in a simple and economical way, to assure a general-purpose self-monitoring control with a double level warning as described in this application. Further, the known system requires a series of circuits, at times complex, intervening in combination with signal $\delta_2$, to intervene upstream and downstream from the voter.

The self-monitoring process control system according to this invention comprises two pairs of voters disposed between a digital computation unit and an analog computation unit.

The output signals of the first pair of voters control a first warning signal and are interconnected to the inputs of the other pair of voters; in turn, the output signals of the latter two voters control a second warning signal and, at the same time, an actuator through power loops.

For this purpose, the invention provides a monitoring control system using:
  at least two circuit units each producing control signals from a voter; making it possible to replace control signals coming from the law implementing system, when they are erroneous, with signals representing maximum allowable safety values (hereafter called safety limit values or more simply stops) calculated by separate circuits independent of those used for implementing the flight control law;
  a circuit producing a first warning signal when the signals at the output of the two voters are not identical; and
  a safety circuit for selecting the signal coming from said two voters which is not erroneous, in case a failure breakdown occurs in one of the said two circuit units, which safety circuit is provided with a self-monitoring circuit making it possible to signal, by a second warning signal, a failure of the safety circuit.

More precisely, for each function of the generating device the present invention provides for two double limit stops computed separately, i.e., two high-level stops $B_1$, $B'1$ and two low-level stops $B_2$, $B'_2$. The two signals representative of the coupled high-level, low-level limit stops ($B_1$, $B_2$ or $B'_1$, $B'_2$), and the control signal from the generating device, are transmitted to a voter or selector, hereinafter referred to as a preformance voter, which compares these three signals and transmits only the signal whose value, at a given instant, is between the values, at the same instant, of the two other signals.

The two signals voted by the two respective voters are then compared by means of a first comparator which sends a warning signal when the two voted signals are not identical.

Obviously in case of a very simplified construction mode of the present invention, the signal from one of the voters can be transmitted directly to the power loop associated with an execution device.

According to a more complex construction mode of the present invention, the two signals from the two respective performance voters are transmitted to a voter, called safety voter, which also recieves a reference signal at its third input. This reference voter is also lined through its output to the power loop associated with an actuator.

Thus, on a failure in one of the circuits associated with one of the performance voters, the safety voter will select the signal sent by the voter to the circuit which operates correctly.

According to a different construction mode of the present invention the two signals voted respectively by the two performance voters are transmitted to two voters, called safety voters, which receive a reference signal at their third input. These two voters are lined to two power loops as follows: the first one consists of a image loop which is of the second power loop which is itself linked through its output, to an execution device. In addition the output signals from the two power loops are compared by means of a comparator sending a warning signal when these two signals differ from one another.

Such an arrangement therefore permits detection of a failure occurring on one of the two safety voters and/or one of the power loops linked to them.

It will be noted that, in the case of an aircraft automatic flight control system, the above-mentioned generating device consists of a computer which can assure the following functions:
  control of the aircraft automatic throttle in the main flight control modes such as acquisition and holding of the engine speed from take-off to taxiing.
  acquisition and hold of a speed over the total flight envelope;
  the elevation guidance of the aircraft, for instance an optimized guidance during take-off and full throttle;
  fuel consumption management, such as optimizing of climb, cruise speed, descent and/or approach.

Moreover, the safety limit stops can vary and will depend upon the flight control mode and the aircraft configuration.

A preferred embodiment of the present invention will be described below, as a non-limiting example, referring to the attached drawing in which:

The sole FIGURE is a theoretical block diagram of a control system corresponding to an aircraft "speed acquisition and hold" mode.

The control system as shown in this diagram essentially comprises two computation elements, i.e.:

a digital computation element (block 1) generating signals representative of the control signal and high-level and low-level limit stops, from the aircraft parameters and reference values;

an analog computation element (block 2) which comprises a power stage, comprising two meter-power loops, associated with an actuator 3 which consists, as shown in the illustration, of an autothrottle lever controlled by a servomotor and a safety circuit.

The digital computation element consists of two channels (blocks 4 and 5 within dotted lines) respectively comprising two arroys of complementary processors.

In the example shown, one of these two processors (unit 4) first comprises a computation unit (unit 6) intended to generate the control order for the servomotor of the throttle lever, for the speed gain and hold mode, from the aerodynamic speed of the aircraft detected by an air data or anemometric computer (unit 7), from a reference speed (arrow 9) and from the acceleration along the longitudinal axis of the aircraft supplied by an accelerometer computer (unit 8).

Processor 4 also generates signals representing the high and lower stops of the throttle lever which correspond, for the high stop (unit or circuit 10) to protection from overrunning of the drive unit and for the low stop (unit 11) protection from a high angle of attach of the aircraft. For this purpose, the circuit generating the high stop (unit 10) receives a signal resulting from the difference (subtractor 12) between a signal representing a maximum value of the engine speed (unit 13) and a signal representing a maximum of this speed (arrow 14). The circuit generating the low stop receives a signal representing the angle of attack of the aircraft (sensor 15).

The three signals supplied by units 6, 10 and 11 are successively transmitted to a performance voter 16 which delivers at its output, at a given moment provided by the program, that one of the input signals whose value is between the values of the two other input signals.

Processor 5 comprises two circuits generating stop signals: (unit or circuit 17 for the low stop, unit or circuit 18 for the high stop) similar to units 10 and 11 of processor 4 and a performance voter 19.

The two signals coming from units 17 and 18 and the second part of the halved signal representative of the control order supplied by computation unit or circuit 6 are transmitted to a second performance voter 19 whose function is the same as voter 16.

It is clear that during normal operation, the signals delivered by the two voters 16 and 19 are equal. On the other hand, if a failure occurs in one of the two processors 4 and 5, the signals output by the two voters 16 and 19 are different.

The analog computation unit 2 which comprises two voter-power loop units, respectively designated by numerals 23;24 and 25;28 and a comparator 29 and is intended to detect such a failure, i.e., to choose between the two control signals given by voters 16 and 19, the one that is not erroneous, and, simultaneously, to monitor a failure that can occur in its own circuit.

Detection of failure occurring in one of the two processors 4 and 5 is achieved by a comparator 21 which receives the output signals of the two voters 16 and 19 and which transmits a warning signal indicated by (arrow 22) when its two input signals are different.

Choice of the control signal is made by a voter 23, called a safety voter, which receives at its three inputs the signals delivered by the voters 16 and 19 and a reference signal indicated by arrow 24. This safety voter 23 is connected, at its output, to the power loop 25 which controls the servomotor of the throttle lever (actuator 3).

Thus, in case a failure occurs in one of the two processors 4 or 5, for example in processor 4, the control signal voted by voter 16 is erroneous while that supplied by voter 19 is correct (one of the safety stops is voted). The difference between the output signals of voters 16 and 19 will be detected by a comparator 21 with a certain delay which should be set rather long so as not to detect the deviation of the commands due to lack of synchronization of the computation cycles of the two processors 4 and 5.

The role of safety voter 23 is to vote for the signal coming from the processor that functions correctly, in this case the signal supplied by voter 19, to avoid controlling the engine with an erroneous order during detection of a failure by comparator 21.

The warning signal delivered by comparator 21 following a failure can be used to assure disconnection of the entire control system.

Monitoring of the analog computation element is assured by a circuit that is an image of the circuit previously described and which comprises a second monitoring voter 26 which receives at its three inputs the signals coming from the two performance voters 16, 19 and a reference signal (arrow 27). This second voter 26 is connected, at its output, to a circuit 28, an image of the power loop 25, whose output is connected to one of the two inputs of a comparator 29.

Comparator 29 receives, at its second input, the signal produced by power loop 25 and delivers a warning signal when the two signals provided by power loop 25 and circuit 28 are different, which occurs when a failure occurs in one of the two safety couples of voter 23, and of power loop 25; and/or safety voter 26, and power loop 28.

It will be noted that in the system described above, choice between the halved order emitted by unit 6 and the two safety stop circuits 10-11; 17-18 is made by digital voters 16,19.

This invention makes it possible, on the one hand, to achieve an economy of circuits because the vote is made by a program and, on the other hand, a limitation of the number of analog/digital converters or sample and hold circuits which would be necessary if analog voters were used.

I claim:

1. A self-monitoring control device to control at least one actuator (3) which is controlled by a command signal, means (7,8, and 9) for generating signals corresponding to sensed parameters upon which said control signal is based, said control system comprising at least one digital computing channel (1) which includes:

a computing unit (6) operating in conjunction with said signal generator means (7,8,9) and producing an output signal;

two pairs of limiter circuits (10,11), (17,18), one circuit (10,17) of said each pair generating a signal representative of an upper limit value and the other circuit (11,18) generating a signal representative of a lower limit value;

two voters (16,19); circuit means for connecting one input of each of said two voters to the output of said computing unit (6), circuit means for connecting the other two inputs of one of said voters (16) to the outputs of both circuits of said two pairs of limiter circuits (10,11), circuit means for connecting the other two inputs of the other voter (19) to the outputs of both of the other pair of limiter circuits (17,18), each of said voters (16,19) comprising means to select and transmit that one of the three signals received at the inputs thereof whose value is between those of the other two input signals thereat, said self-monitoring control system further comprising another computing unit (2) which includes:

a comparator (21), circuit means for connecting the inputs thereof to the outputs of said two voters (16,19), said comparator (21) comprising means for receiving said selected and transmitted signals and for transmitting a warning signal only when said two selected signals are not identical;

two interconnected voters (23,26) circuit means for connecting the outputs of both of said voters (16,19) as one of the inputs to each of said voters (23,26), means (24,27) for generating a reference signal; circuit means for connecting another input of each of said interconnected voters (23,26) to said reference signal generating means (24,27);

two power loops (25,28), circuit means for connecting the inputs of said power loops to the outputs of said interconnected voters (23,26);

circuit means for connecting the output from one of said power loops (25) to said actuator (3);

a comparator (29), circuit means for connecting the output of said comparator (29) to the outputs of both of said power loops (25,28), and said comparator being adapted to make a comparison between the output signals from said two power loops and to transmit a warning signal when said two power loop output signals are not identical.

2. A control device according to claim 1, in which said output signal of said computating unit (6) generates signals representative of said command signal and said upper and lower limit values correspond to aircraft flight parameters and reference values, and said actuator (3) is an aircraft flight control means.

3. A control device according to claim 2, wherein the voters 16 and 19 are digital voters and the voters 23 and 26 are analog voters.

* * * * *